(12) United States Patent
L'Ecuyer et al.

(10) Patent No.: US 11,372,586 B2
(45) Date of Patent: Jun. 28, 2022

(54) SYSTEM AND METHOD FOR REGULATING NVME-OF COMMAND REQUESTS AND DATA FLOW ACROSS A NETWORK WITH MISMATCHED RATES

(71) Applicant: Hewlett Packard Enterprise Development LP, Houston, TX (US)

(72) Inventors: Brian Peter L'Ecuyer, Elk Grove, CA (US); Charles Tuffli, Roseville, CA (US); Steven Lahr, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/878,444

(22) Filed: May 19, 2020

(65) Prior Publication Data

US 2021/0365209 A1 Nov. 25, 2021

(51) Int. Cl.
*G06F 3/06* (2006.01)

(52) U.S. Cl.
CPC .......... *G06F 3/0659* (2013.01); *G06F 3/0613* (2013.01); *G06F 3/0631* (2013.01); *G06F 3/0653* (2013.01); *G06F 3/0679* (2013.01)

(58) Field of Classification Search
CPC .... G06F 3/0659; G06F 3/0653; G06F 3/0679; G06F 3/0631; G06F 3/0613; G06F 3/067; H04L 49/00
See application file for complete search history.

(56) References Cited

U.S. PATENT DOCUMENTS

| | | | | |
|---|---|---|---|---|
| 6,954,469 | B1* | 10/2005 | Dygert | H04N 21/23406 348/E5.008 |
| 7,251,701 | B2* | 7/2007 | Chikusa | G06F 3/0613 711/167 |
| 10,545,697 | B1* | 1/2020 | Tsirkin | G06F 9/45558 |
| 2002/0059439 | A1* | 5/2002 | Arroyo | H04L 67/1097 709/230 |
| 2017/0249104 | A1* | 8/2017 | Moon | G06F 3/0659 |
| 2017/0371582 | A1* | 12/2017 | Chrysanthakopoulos | H04L 67/16 |
| 2018/0173462 | A1* | 6/2018 | Choi | G06F 3/0659 |
| 2018/0203605 | A1* | 7/2018 | Tseng | G06F 3/0679 |
| 2019/0079895 | A1* | 3/2019 | Kim | G06F 3/061 |
| 2020/0057582 | A1* | 2/2020 | Shin | G06F 3/061 |
| 2020/0210104 | A1* | 7/2020 | Grosz | G06F 3/0604 |
| 2020/0218470 | A1* | 7/2020 | Cho | G06F 3/0659 |
| 2020/0244583 | A1* | 7/2020 | Smith | H04L 49/356 |

* cited by examiner

*Primary Examiner* — Charles Rones
*Assistant Examiner* — Tong B. Vo
(74) *Attorney, Agent, or Firm* — Park, Vaughan, Fleming & Dowler LLP (57) ABSTRACT

One embodiment can provide a method and system for implementing flow control. During operation, a switch identifies a command from a host to access a storage device coupled to the switch. The switch queues the command in a command queue corresponding to the host. In response to determining that an amount of data pending transmission to the host from the storage device is below a predetermined threshold, the switch removes a command from the command queue and forwards the removed command to the storage device.

20 Claims, 7 Drawing Sheets

SYSTEM AND METHOD FOR REGULATING NVME-OF COMMAND REQUESTS AND DATA FLOW ACROSS A NETWORK WITH MISMATCHED RATES

BACKGROUND

This disclosure is generally related to storage systems. More specifically, this disclosure is related to a system and method that regulates the flow rate between host devices and storage arrays.

Non-volatile memory express over fabric (NVMe-oF) allows computer servers (or hosts) to communicate with a storage system over a network. For example, a host can read/write a solid-state drive (SSD) located on a separate piece of hardware over a switched fabric. The speed of the network port on a host can be different from the link speed of the storage array. The mismatched link rates between the host-fabric link and the storage-array-fabric link can result in the significant underuse of the full link bandwidth.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown, but is to be accorded the widest scope consistent with the principles and features disclosed herein.

The embodiments described herein provide a solution for end-to-end flow control in networked devices implementing the NVMe-oF technology. The flow-control mechanism determines, a priori, a transmission flow rate between the storage array and the host devices to prevent frame drops and achieve near maximum link throughput. In addition, to prevent the uneven distribution of storage resources of the storage array among hosts accessing the storage array, which can also lead to the underuse of the total available bandwidth of the storage array, the switch can implement command queues for queuing command requests received from the hosts before delivering these command requests to the storage array. More specifically, the switch maintains a set of command queues, one command queue per host, which can delay the submission of newly received command requests from a particular host to the storage array if data pending transmission to that host exceeds a predetermined threshold.

One embodiment can provide a method and system for implementing flow control. During operation, a switch identifies a command from a host to access a storage device coupled to the switch. The switch queues the command in a command queue corresponding to the host. In response to determining that an amount of data pending transmission to the host from the storage device is below a predetermined threshold, the switch removes a command from the command queue and forwards the removed command to the storage device.

In a variation on this embodiment, the switch maintains a plurality of command queues. Each command queue in the plurality of command queues corresponds to a different host coupled to the switch.

In a variation on this embodiment, the predetermined threshold is determined based on a size of memory space allocated to the host by the storage device.

In a variation on this embodiment, the switch divides a command into multiple smaller commands and places the multiple smaller commands into the command queue.

In a variation on this embodiment, a controller of the storage device generates an entry in a work-request queue corresponding to the host based on the command. The entry specifies a size of a data frame associated with the command.

In a further variation, the host is coupled to the switch via a first communication link, the storage device is coupled to the switch via a second communication link, and the first and second communication links have different link rates. The storage device determines a link rate with the host and sets a starting value of a countdown timer based on the determined link rate and the size of the data frame.

In a further variation, the host and the storage device communicate with each other using a non-volatile memory express over fabric (NVMe-oF) technique and determine the link rate by exchanging information associated with the different link rates while performing NVMe-oF connection establishment.

In a further variation, a controller module coupled to the switch is configured to determine a link rate of the first communication link, determine a link rate of the second communication link, and determine the link rate based on the determined first and second communication link rates.

In a further variation, the starting value of the countdown timer equals a duration needed for transmitting the data frame using the determined link rate.

In a further variation, the storage device runs the countdown timer while transmitting the data frame to the host and waits for the countdown timer to expire before transmitting a subsequent data frame corresponding to a next entry in the work-request queue.

Flow Control for NVMe-oF

Figure 1:
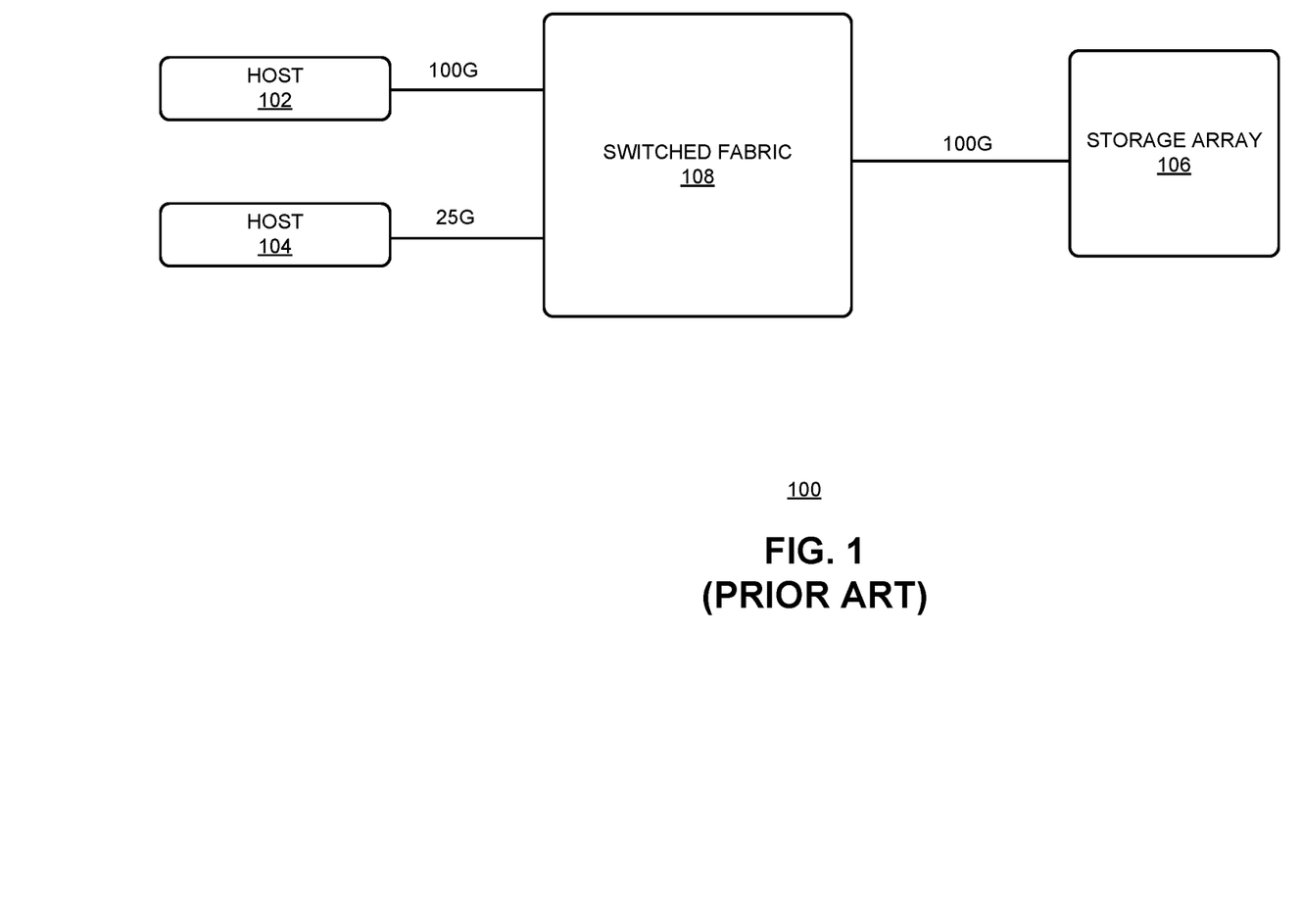
FIG. 1 presents an exemplary storage system, according to prior art.

FIG. 1 presents an exemplary storage system, according to prior art. Storage system 100 can include a number of hosts (e.g., host 102 and host 104), a storage array (e.g., an SSD storage array) 106, and a switched fabric 108 that includes one or more interconnected switches. The hosts and storage array 106 can support NVMe-oF, thus allowing a host to access (e.g., read or write) storage array 106 via switched fabric 108.

In FIG. 1, storage array 106 is connected to switched fabric 108 via a high-speed link (e.g., a 100 Gbps link) and host 102 is also connected to switched fabric 108 via a high-speed link. However, host 104 is connected to switched fabric 108 via a low-speed (e.g., a 25 Gbps link). The difference in link rates between host 104 and storage array 106 can cause the underutilization of the high-speed link of storage array 106. More specifically, when host 104 reads data from storage array 106, the data are provided at the rate of 100 Gbps, which can easily overwhelm the 25 Gbps link of host 104 (e.g., causing congestions on the 25 Gbps link).

One existing approach to handling the rate difference between the slower link of the host and the faster link of the storage array is to buffer frames sent over the faster link within the switched fabric while waiting for available spaces in the output queue of the slower link (in this example, the output queue assigned to host 104). However, the amount of buffering that can be provided by the switched fabric is limited, and without the end-to-end control to slow down the sender (in this example, storage array 106), the buffer space will eventually be exhausted, resulting in dropped frames.

To implement end-to-end flow control, one existing approach detects the occurrence of frame drop resulting from the switch buffer being exhausted, and requests the sender (e.g., the storage array or the host) to back off (e.g., refrain from providing requested data or sending additional requests) from transmission. Another existing approach relies on the switch sending an Explicit Congestion Notification (ECN) packet to the sender, when the switch buffer is occupied up to a certain threshold. Both approaches involve starting transmission (e.g., sending frames) at a lower rate, and then gradually increasing the transmission rate until detection of a dropped frame or generation of an ECN packet. Upon detecting the congestion (e.g., by receiving an ECN packet), the sender reduces its transmission rate. For example, the sender may reduce its transmission rate to half and then gradually increases it until another congestion event is detected. This can result in the saw-tooth-shaped performance curve, where the use rate of the available link is somewhere between 50% and 100%.

An additional scheme to alleviate congestion uses a pause frame to stop the sender from overflowing the switch buffer. However, this pause mechanism can lead to head-of-line blocking as well as a significant degradation of the system performance as the number of switch hops increases.

To provide end-to-end flow control for the storage system without the aforementioned problems, some embodiments discussed herein provide mechanisms to determine, a priori, what the flow rate should be between the storage array and the host devices. More specifically, during the initial stage of establishing communications between a host and a controller of the storage array, the effective link rates of the devices can be exchanged. For example, during the initial handshake, a host and the storage array can exchange their link rates. If the link rate of the host is less than that of the storage array, the network interface on the storage array can use the lower link rate of the host to control how quickly frames can be sent back to the host. Alternatively, the management module (which can be a hardware module or a software program executable by a processor) of the switch can be used to obtain physical link interface speeds of the devices (e.g., hosts and storage arrays) in the network.

Figure 2:
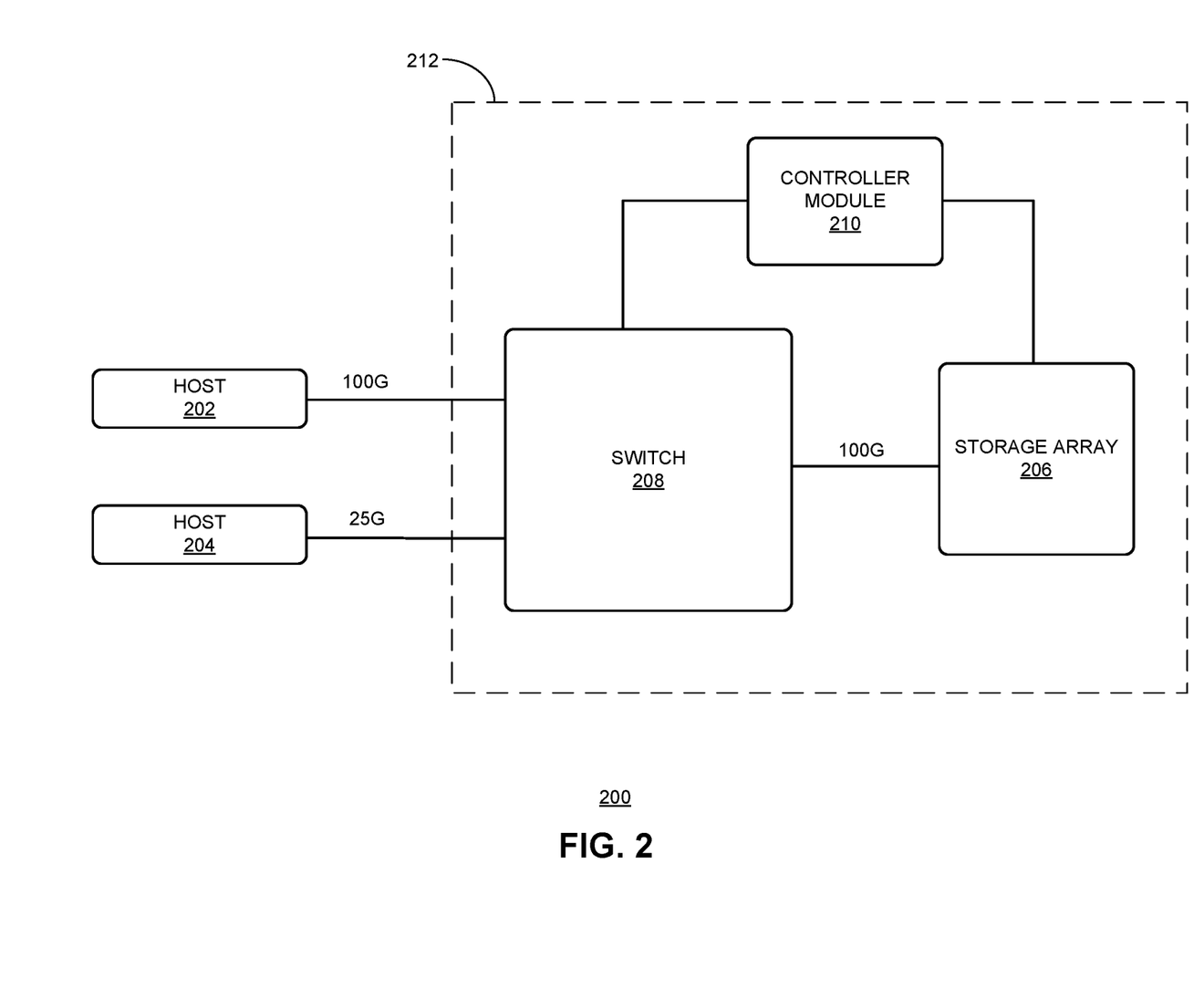
FIG. 2 illustrates an exemplary storage system, according to one embodiment.

FIG. 2 illustrates an exemplary storage system, according to one embodiment. Storage system 200 can include a plurality of hosts (e.g., hosts 202 and 204), one or more storage arrays (e.g., storage array 206), a switch 208, and a controller module 210. Hosts 202 and 204 can be coupled to switch 208 via various types of wired or wireless connections. Similarly, storage array 206 can also be coupled to switch 208 via various types of wired or wireless connections. Hosts 202 and 204 can access storage array 206 via switch 208. Controller module 210 can communicate with switch 208 as well as storage array 206. In some embodiments, the storage arrays (e.g., storage array 206), switch 208, and controller module 210 can be placed inside a physical enclosure 212. Physical enclosure 212 can conform to a predetermined form factor (e.g., being able to fit into a slot on a standard chassis). Alternatively, each of the storage arrays, switch 208, and controller module 210 can be a standalone hardware module. The different hardware modules can be located at different physical locations and can be coupled to each other via wired or wireless couplings.

In some embodiments, switch 208 can include a switch compatible with the Ethernet protocol. Depending on the application, it is also possible for the switch to be compatible with other types of communication protocol (e.g., a Fibre Channel or InfiniBand® protocol). In some embodiments, storage array 206 can include a number of physical drives, such as SSDs and hard-disk drives (HDDs). In some embodiments, the hardware of the network interface (e.g., a network interface controller (NIC)) of storage array 206 can maintain a set of queues of work requests (e.g., data-transmission requests), one queue per host, with each work request describing the memory regions containing data to be sent over the link to a corresponding host. These queues can be characterized as work-request queues. Moreover, each queue can maintain a link rate and a countdown timer that tracks the time to send a next frame. More specifically, the link rate can be determined during the initial handshake process when storage array 206 establishes communication with the corresponding host. Alternatively, instead of having storage array 206 to negotiate the link rate with a host, the system can rely on controller module 210 to determine the link rate. Controller module 210 communicates with both storage array 206 and switch 208, and can be aware of the link rates on either side of switch 208. Therefore, it can determine a rate that should be used by storage array 206 to communicate with a particular host. Controller module 210 can then send such rate information to storage array 206.

In the example shown in FIG. 2, the link rate of storage array 206 is 100 Gbps, the link rate of host 202 is 100 Gbps, and the link rate of host 204 is 25 Gbps. During the initial handshake, storage array 206 and host 202 can negotiate their communication link rate as 100 Gbps, meaning that when providing data to host 202, storage array 206 can transmit the data at a rate of 100 Gbps. Similarly, during the initial handshake, storage array 206 and host 204 can negotiate their communication link rate as 25 Gbps. The work-request queue for host 202 kept by storage array 206 can include pending requests for transmitting data to host 202 and can maintain a record indicating the negotiated link rate as 100 Gbps, whereas the work-request queue for host 204 can include pending requests for transmitting data to host 204 and can maintain a record indicating the negotiated link rate as 25 Gbps. Each work request can indicate the memory location of a to-be-transmitted frame and its length.

The work-request queue for host 202 can also maintain a countdown timer, which can be used to determine a time instant for transmitting a next frame. The starting value of the timer can be determined based on the length of a frame about to be transmitted (i.e., an immediately-to-be-transmitted-frame) and the negotiated link rate. In the example shown in FIG. 2, the network interface hardware of storage array 206 can determine, based on the records kept in the work-request queue for host 204, that the negotiated link rate for host 204 is 25 Gbps. If storage array 206 is about to send a frame of a length of 2500 bytes to host 204, it can determine the amount of time needed for transmitting that frame is 2500 bytes*8 bits/byte/25 Gbps=800 ns. Consequently, the work-request queue for host 202 can set its timer starting value to 800 ns. The network interface of storage array 206 is configured such that no frame will be transmitted until the countdown timer reaches zero. In other words, subsequent to starting the transmission of the frame and setting the starting value of the countdown timer, the network interface of storage array 206 waits for the countdown timer to reach zero before starting to transmit a next frame. Note that, because the link rate of storage array 206 is 100 Gbps, the amount of time needed for storage array 206 to finish the transmission of the 2500 byte frame is 2500 bytes*8 bits/byte/100 Gbps=200 ns. This means that, after finishing the transmission of the 2500 byte frame, storage array 206 needs to wait for an additional 600 ns, before starting the transmission of a next frame in its output queue to host 202. On the other hand, because the link rates of storage array 206 and host 202 are matched, there is no additional wait time needed between frames when storage array 206 is transmitting to host 202.

Figure 3:
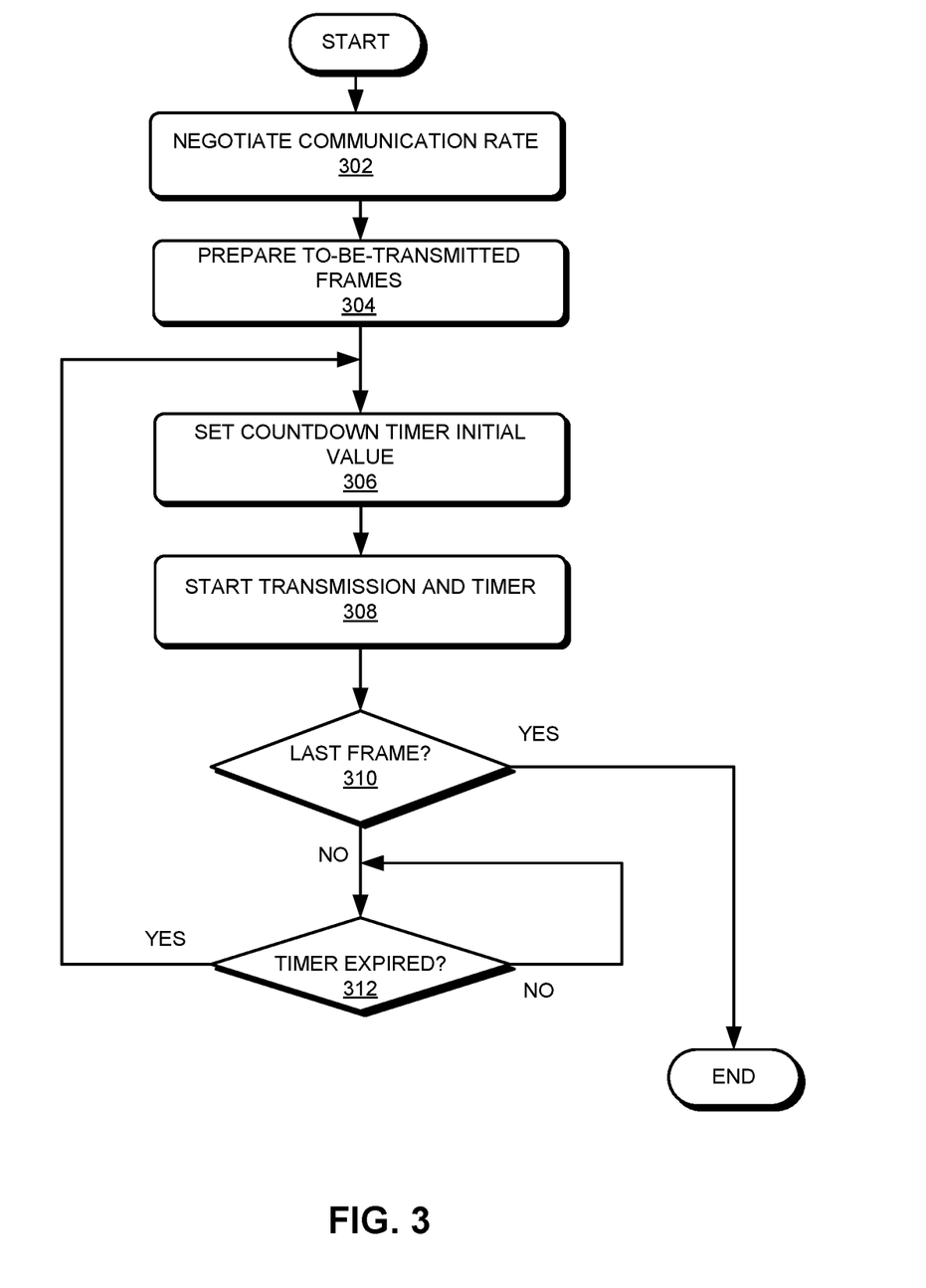
FIG. 3 presents a flowchart illustrating an exemplary frame-transmission process of a storage array, according to one embodiment.

FIG. 3 presents a flowchart illustrating an exemplary frame-transmission process of a storage array, according to one embodiment. During an initial stage for establishing communications, the storage array can negotiate, with a host accessing the storage array, a rate for communicating with each other (operation 302). If the storage array is coupled to the switched fabric via a link that has a link rate that is lower than the link between the switched fabric and the host, the negotiated link rate will be the lower link rate of the host. In general, if the host and the storage array have mismatched link rates, the negotiated communication rate can be the lower link rate. In some embodiments, the rate-negotiation process can be an extension of the existing connection establishment procedure defined by the NVMe-oF protocol. More specifically, the NVMe-oF connection-establishment handshake can be extended to include the exchange of link rates of the endpoints.

Subsequent to negotiating the link rate, the storage array can be ready to transmit data requested by the host to the host via the switched fabric. At the beginning, the storage array prepares a number of frames to be transmitted to the host (operation 304). The size of each frame and the number of frames can be determined by a number of factors, such as the amount of data requested by the host and the communication protocol implemented by the switched fabric. The location and size of each frame can be stored in the work-request queue maintained by the network interface of the storage array. The storage array sets the initial value of a countdown timer based on the negotiated link rate and the size of an immediately to-be-transmitted frame (operation 306). At the beginning of the transmission, the immediately to-be-transmitted frame can be the initial frame of a series of frames that are to be transmitted to the host, as indicated by the head entry of the work-request queue. If a number of frames have been transmitted, the immediately to-be-transmitted frame can be the frame that is next in line. The initial value of the countdown timer is set to a time value that equals the amount of time needed for completing the transmission of the frame at the negotiated rate. For example, if the negotiated rate is 25 Gbps and the size of the first frame is 2500 bytes, the initial value of the countdown timer can be set to the amount of time needed for completing the transmission of 2500 bytes at a speed of 25 Gbps, which is 800 ns.

The storage array starts to transmit the frame and also starts the countdown timer (operation 308). The transmission of the frame and the countdown timer can be started substantially at the same time. Note that the storage array, in some examples, may transmit the frame out of the storage array at the link rate of the storage array, which may be higher than the negotiated rate. In such a scenario, the frame can be buffered at the switched fabric, before being sent to the host. While waiting the countdown timer to expire, the storage array may transmit data to other hosts.

Subsequent to transmitting the frame, the storage array may determine if it is the last frame (operation 310). If so, the transmission ends. If not, the storage array determines whether the countdown timer expires (operation 312). If not, the storage array waits for the countdown timer to expire. If the countdown timer expires, the storage array resets the countdown timer based on the next frame (operation 306) and subsequently starts the frame transmission and the countdown timer (operation 308).

In the example shown in FIG. 3, a countdown timer is set for each immediately-to-be-transmitted frame. This specific implement is used for description purposes. In some embodiments, once the link rate is determined a priori (e.g., through link rate negotiation), the calculation of the flow rate (e.g., the rate to send frames from the storage array to the switched fabric) can be done at an aggregated level, instead of frame-by-frame. For example, the flow rate can be calculated by dividing the total number of bytes sent over a programmable time interval, which can be programmed using a countdown timer. The storage array can then be configured in such a way that it only sends additional frame(s) if sending the additional frame(s) does not exceed the negotiated flow rate for the most recent programmed time interval (e.g., the additional frames are sent after the expiration of the countdown timer). In other words, instead of the frame-by-frame transmission example shown in FIG. 3, the system can control the transmission of data blocks of arbitrary sizes, as long as the overall transmission rate does not exceed the negotiated link rate. In these examples, a single countdown timer can be used for controlling the transmission of a plurality of frames, not just a single frame.

By implementing the countdown timers at the storage array for each frame transmission, the disclosed embodiments ensure that the transmission rate of the storage array is regulated such that a slower link at the host side is not overwhelmed by the higher-speed transmission by the storage array. However, regulating the transmission rate of the storage array alone cannot resolve all congestion. More specifically, a host with a slower link may issue an excessive number of command requests (e.g., read requests) to the storage array, exhausting the memory on the storage array and causing the storage array to delay the service of command requests from other hosts. This can also lead to the underuse of the link rate of the storage array. To prevent a slower host from exhausting memory resources on the storage array, in some embodiments, the system can also regulate the arrival of the command requests from the different hosts at the controller of the storage array to fairly distribute the storage array's capacity for servicing command requests fairly among the hosts having various link rates.

In some embodiments, to regulate the command requests from the host, the switched fabric can maintain a set of command queues, one per host, with each command queue storing command requests arrived at the switched fabric from a particular host. In other words, the command requests from a particular host are queued in a corresponding command queue, before being forwarded to the storage controller. Each command queue maintains a record that indicates the amount of data (e.g., in bytes) that is pending transmission for the corresponding host. Data is pending transmission when the storage array controller allocates space in the memory of the storage array for the data.

Figure 4:
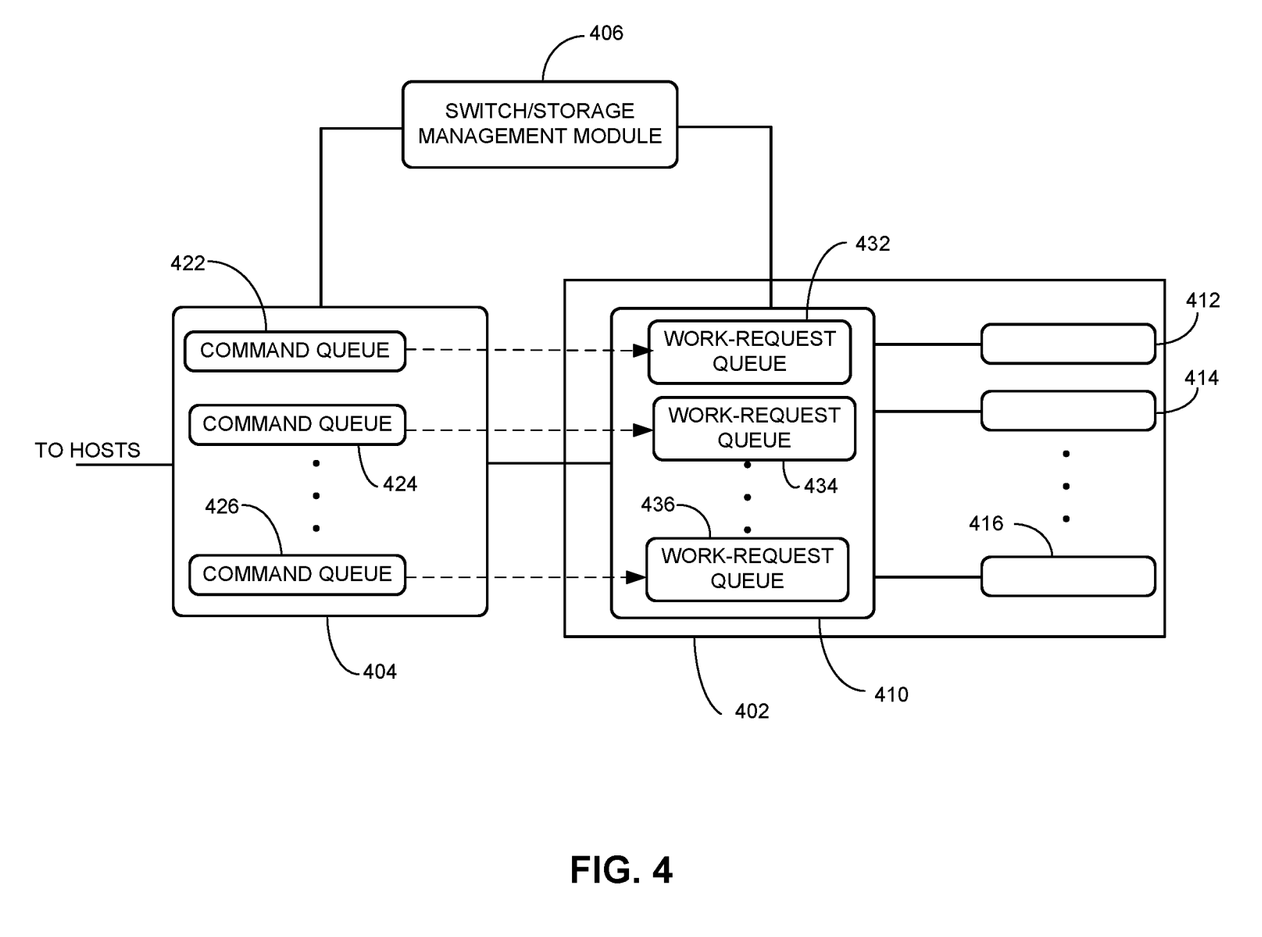
FIG. 4 presents a diagram illustrating the mechanism for regulating the command requests, according to one embodiment.

FIG. 4 presents a diagram illustrating the mechanism for regulating the command requests, according to one embodiment. In the example shown in FIG. 4, a number of hosts (not shown in FIG. 4) can send command requests to a storage array 402 via a switch 404. Storage array 402 can include a storage-array controller 410 and a number of physical drives (e.g., drives 412, 414, and 416). A switch/storage management module 406 can be coupled to both switch 404 and storage-array controller 410.

Switch 404 can maintain a number of command queues (e.g., queues 422, 424, and 426) that can be used for temporarily holding command requests received from the hosts. In some embodiments, these command queues are maintained by the hardware (e.g., an application-specific integrated circuit (ASIC) module) located on switch 404. A command request can be a read or write request. The number of command queues corresponds to the number of hosts coupled to switch 404, with one queue being assigned to each host. Depending on the identity of the host issuing the request command arriving at switch 404, switch 404 places the request command into a corresponding queue. These command queues maintained by switch 404 can sometimes be referred to as "shadow" queues, because the hosts are not aware of these queues.

Each command queue on switch 404 can maintain a record of the amount of data that is pending transmission to the switch. Such a record can be provided by switch/storage management module 406, which constantly checks the amount of data pending transmission in a corresponding work-request queue. An entry in the work-request queue indicates the memory location and length of a to-be-transmitted data frame. The work-request queues (e.g., work-request queues 432, 434, and 436) can be maintained by storage-array controller 410, one queue per host. For example, work-request queue 432 can be assigned to a particular host, meaning that each entry in work-request queue 432 identifies a location and length of a frame pending transmission.

When a command request from a host for accessing data stored in storage array 402 arrives at switch 404, instead of directly forwarding the command request to storage array 402, switch 404 stores the command request in a command queue (e.g., command queue 422) corresponding to the host sending the command request. Command queue 422 maintains a record that indicates the amount of data pending transmission from storage array 402 to this particular host. Note that the amount of data can correspond to the total size of frames identified by all entries in work-request queue 432, which corresponds to the same particular host. This data amount also reflects the total amount of memory resources that storage-array controller 410 has provisioned for that particular host. In some embodiments, switch/storage management module 406 monitors the status of each work-request queue and provides information regarding the total amount of data in each work queue pending transmission to the corresponding command queue. For example, switch/storage management module 406 can monitor the status of work-request queue 432 and provide information regarding entries in work-request queue 432 to command queue 422. Such information can include the total amount of data pending transmission by storage array 402 to the host corresponding to work-request queue 432 to command queue 422.

Command queue 422 can then determine if the total amount of data pending transmission (i.e., the amount of data corresponding to entries in work-request queue 432) for the host exceeds a predetermined threshold. If the pending data for a particular host exceeds the threshold, one may consider that storage-array controller 410 has provisioned a fair share of memory resources to this particular host. As a result, switch 404 may temporarily stop forwarding command requests from this particular host to storage-array controller 410 to prevent storage-array controller 410 from provisioning additional memory resources to this particular host. On the other hand, if the pending data for a particular host is below the threshold, switch 404 may start to forward one or more received command requests to storage-array controller 410 to allow storage-array controller 410 to allocate memory resources on storage array 402 to buffer data. For example, if a command request is a read request, storage-array controller 410 can identify the to-be-read data in the drives of storage array 402 and make a copy of such data in its memory. Storage-array controller 410 can create one or more entries in the work-request queue for the to-be-read data, with an entry in the work-request queue describing the location and size of a memory block containing the to-be-read data.

In certain scenarios, the amount of data requested by a read command may exceed the memory space that is available for provisioning to the particular host. For example, a host may send a read request to switch 404, requesting a large amount (e.g., 32 megabytes) of data stored on storage array 402. However, the amount of memory space that can be provisioned to this host may be less than the requested amount (e.g., the difference between the predetermined threshold and memory space currently provisioned to the host is less than 32 megabytes). In such a scenario, switch 404 can divide a single large read command into multiple (e.g., at least two) smaller read commands and can send the smaller read commands one by one to storage array 402 as memory space becomes available. This way, instead of waiting for a large block of memory space to be released for this host in order to deliver a large command request, switch 404 can start forwarding portions of the large command request as smaller command requests as smaller blocks of the memory space become available, which can be more efficient. In one example, switch 404 can divide a command request into multiple (e.g., at least two) smaller command requests in response to the size of the command request exceeding a predetermined threshold, regardless of the size of the available memory space. In such a scenario, a large command request can be divided into multiple (e.g., at least two) smaller command requests before being queued into the corresponding command queue. In other words, switch 404 can divide a large command into multiple smaller commands and then place the smaller commands into the corresponding command queue.

While the command requests are being regulated or queued in the command queues, storage array 402 transmits data described by entries in work-request queues to a destination host via switch 404. A standard arbitration mechanism (e.g., round robin) can be used by storage-array controller 410 to select, from the plurality of work-request queues, a work-request queue for transmission. Each time a data frame is transmitted, the total amount of data pending transmission for the corresponding host decreases.

As discussed previously, the various modules shown in FIG. 4, such as storage array 402, switch 404, and switch/storage controller 406 can be placed inside a single physical enclosure to form an integrated module. In such a scenario, various types of connections (e.g., optical or electrical cables, transmission lines on a printed circuit board (PCB), etc.) can be used to form the high-speed link between storage array 402 and switch 404. Alternatively, storage array 402 and switch 404 can each be a standalone module. Switch/storage controller 406 can be a standalone module or can be integrated inside either storage array 402 or switch 404. In embodiments where storage array 402 and switch 404 are two separate modules, one or more electrical or optical cables can connect appropriate ports on each module.

Figure 5:
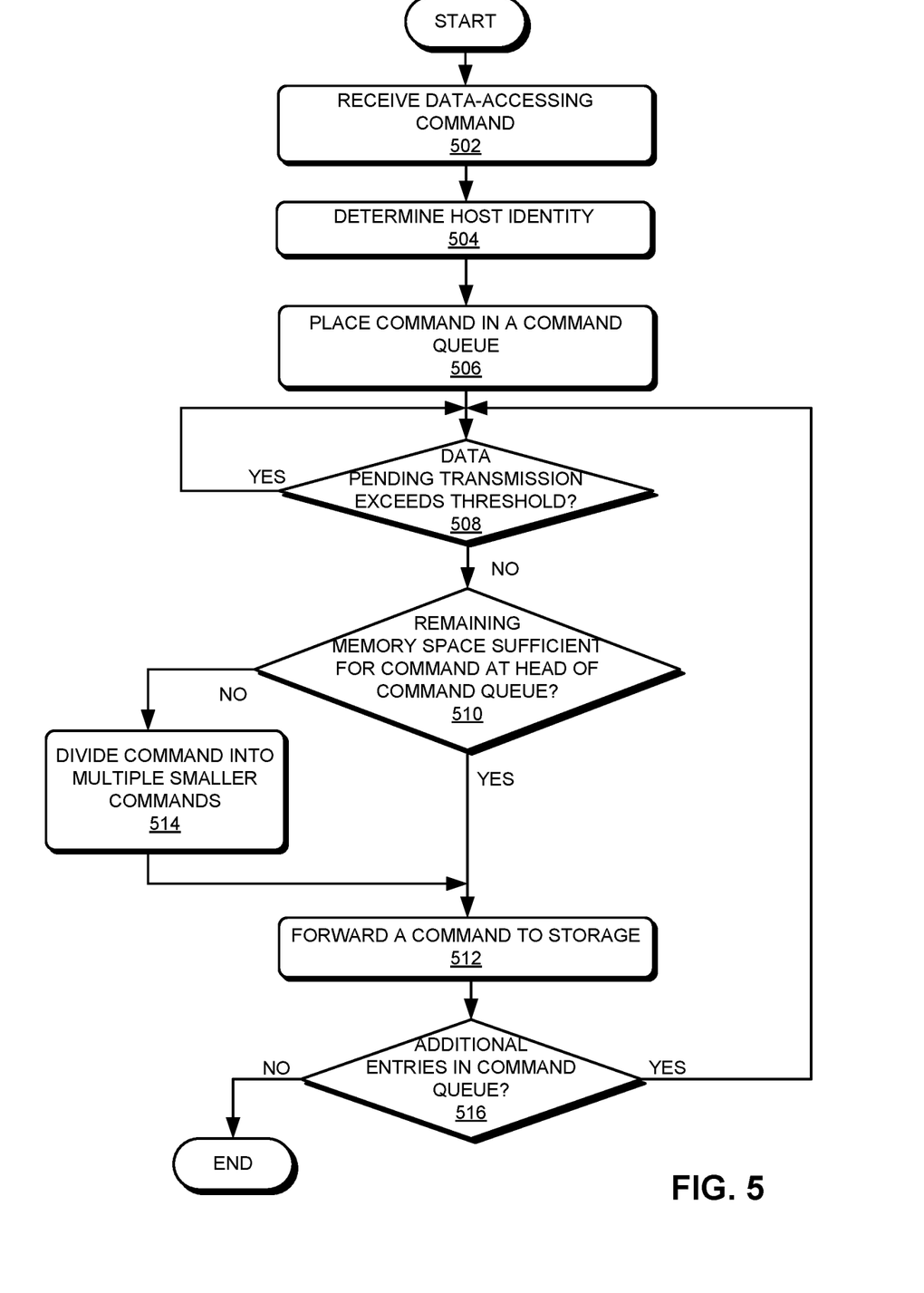
FIG. 5 presents a flowchart illustrating an exemplary process of regulating the delivery of command requests, according to one embodiment.

FIG. 5 presents a flowchart illustrating an exemplary process of regulating the delivery of command requests, according to one embodiment. During operation, a switch coupled to a storage module receives, from a host, a data-accessing command for accessing data in the storage module (operation 502). The switch any be any type of switch that allows a host device to gain access to the storage module. In addition to an individual switch, the switch may also include a number of interconnected switches. The storage module can include any type of storage media (e.g., SSD or HDD). The switch determines the identity of the host (operation 504) and places the received data-accessing command into a command queue based on the identity of the host (operation 506). Note that the switch maintains such a command queue for each host. In some embodiments, the command queue can be a first in, first out (FIFO) queue where earlier entries are removed from the queue before later entries.

The switch can then determine whether the total amount of data pending transmission to the identified host from the storage module exceeds a predetermined threshold (operation 508). In some embodiments, the command queue can maintain a record of the total amount of data that is pending for transmission to the corresponding host. Such information can be provided by a controller module that communicates with both the switch and the storage module. In some embodiments, the command queue can include a comparator that compares the total amount of data pending transmission and the threshold. The threshold can be determined based on a number of factors, such as the size of the memory of the switch module, the number of hosts, the link rate of each host, etc. For example, if the size of the memory of the storage module is 100 GB, the amount of data buffer that can be shared by all hosts can be slightly larger than 100 GB (e.g., 110 GB). In these examples, oversubscribing of the memory resources is allowed due to the transient data. These limited memory resources can be divided among the multiple hosts based on the link speed of each host. In some embodiments, a host having a faster link can be provided with a larger memory provision than a host having a slower link. For example, the memory provision among the hosts can be proportional to their link speeds. Alternatively, the relationship between the memory provisioning and the link rate can be non-linear.

If the total amount of data pending transmission exceeds the threshold, the switch waits for the memory space to be released by the storage array (operation 508). While data-access commands are held in the command queues on the switch, the storage module transmits pending data corresponding to entries in the work-request queues using a process similar to the one shown in FIG. 3. In other words, the network interface of the storage module implements flow control by using a countdown timer. Subsequent to transmitting a data frame, the corresponding memory space can be used to buffer different data, whether from the same host or from a different host.

If the total amount of data pending transmission does not exceed the threshold, the switch can determine if the remaining memory space that can be provisioned to the host can be sufficient for serving the head entry in the command queue (operation 510). For example, the switch logic can compare the requested memory size of the head entry with available memory space. In situations where the total amount of data pending transmission does not exceed the threshold, the difference between the threshold and the total amount of the data pending transmission represents the remaining memory space that can be provisioned to this particular host. If the remaining memory space that can be provisioned to the host is sufficient to serve the head entry, the switch can forward the head entry of the command queue to the storage module to allow the storage module to prepare the data transmission, which can include provisioning memory space for the required data and generating a work-request entry in the work-request queue (operation 512). If the remaining memory space that can be provisioned to the host is insufficient to serve the head entry, the switch can divide the command request into multiple smaller command requests, such that the remaining memory space can meet the memory requirement of at least one smaller command request (operation 514). The switch can also divide a large command request into multiple smaller command requests if the size of the large command request (e.g., the size of the requested data) exceeds a predetermined threshold, regardless of whether the remaining memory space that can be provisioned to the host is sufficient to serve the large command request. Subsequently, the switch can forward at least one command to the storage module (operation 512).

The switch can determine if there are additional entries in the command queue for this host (operation 516). If so, the switch can determine if there is memory space available for this host (operation 508). If not, the operation ends.

Figure 6:
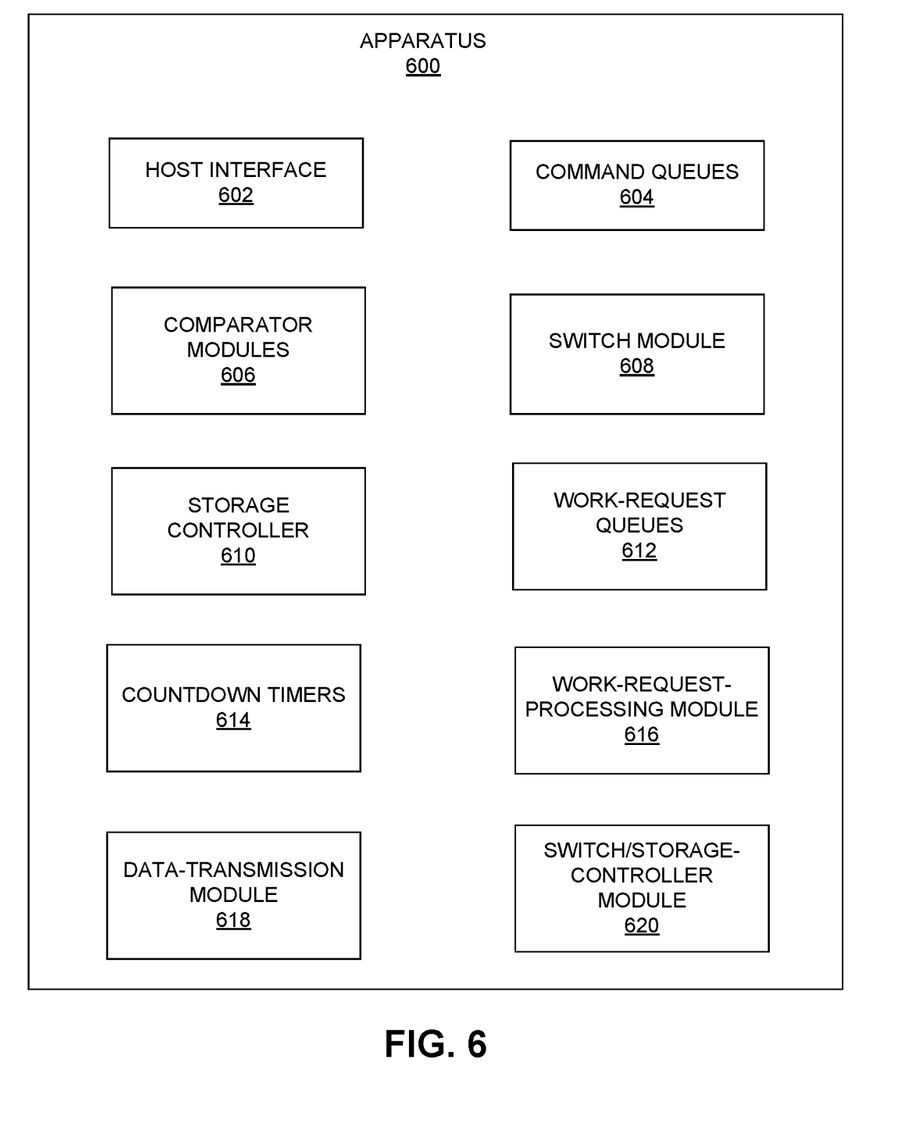
FIG. 6 illustrates an exemplary apparatus that facilitates the flow control in a system comprising NVMe-oF connected devices, according to one embodiment.

FIG. 6 illustrates an exemplary apparatus that facilitates the flow control in a system comprising NVMe-oF connected devices, according to one embodiment. Apparatus 600 can comprise a plurality of units or apparatuses, which may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device(s), which is/are capable of communicating with other computer systems and/or devices.

Apparatus 600 can include a host interface 602 for interfacing with a plurality of hosts. A host can send commands to access data stored on a storage device via host interface 602. Moreover, a host can establish communications with the storage module by exchanging messages with a controller of the storage device (e.g., storage controller 610) via host interface 602. In some embodiments, the messages can include information regarding the link rates of the host and the storage device.

Apparatus 600 can include a number of command queues 604 for queuing commands received from hosts via host interface 602. The number of command queues matches the number of hosts coupled to host interface 602, with each command queue configured to store command requests received from a particular host.

Apparatus 600 can include a number of comparator modules 606. Each comparator module can be coupled to a command queue. More specifically, each comparator module can be configured to compare the amount of data pending transmission by the storage module to a corresponding host to a predetermined threshold. The output of comparator modules 606 can be used to control corresponding command queues 604, allowing a corresponding command queue to forward a command request at the head of the corresponding command queue to the storage module.

Apparatus 600 can include a switch module 608 capable of routing commands and data between hosts and storage modules. Apparatus 600 can also include a storage controller 610 for controlling operations (e.g., data buffering and transmission) of a storage device coupled to switch module 608. Apparatus 600 can include a number of work-request queues 612 for queuing to-be-processed work requests. Each entry in the work-request queue describes the location in memory and the size of a to-be-transmitted data frame. Apparatus 600 can include a number of countdown timers 614, with each countdown timer being coupled to a corresponding work-request queue. Following the transmission of data corresponding to an entry in the work-request queue, subsequent data transmissions for the work-request queue cannot start until the countdown timer returns to zero. The initial value of the countdown timer is set based on the negotiated link rate between the storage module and the host corresponding to the work-request queue and the size of the frame currently being transmitted. This can ensure that the storage module does not transmit the subsequent frame to the host until switch module 608 has completed the transmission of the previous data frame.

Apparatus 600 can include a work-request-processing module 616 configured to process work requests in work-request queues 612. Work-request-processing module 616 can implement a standard arbitration mechanism to select, from work-request queues 612, a work-request queue for processing work requests. When processing a work request, work-request-processing module 616 can access the memory location specified by the work request to obtain data for transmission to a corresponding host. Apparatus 600 can also include a data-transmission module 618 configured to transmit data obtained from the storage module to the host.

Apparatus 600 can include a switch/storage-controller module 620 capable of controlling operations of both switch module 608 and storage controller 610. More specifically, switch/storage-controller module 620 can facilitate the rate negotiation between a host coupled to switch module 608 and the storage module controlled by storage controller 610. Switch/storage-controller module 620 can facilitate the forwarding of a command request from command queue 604 to storage controller 610.

Figure 7:
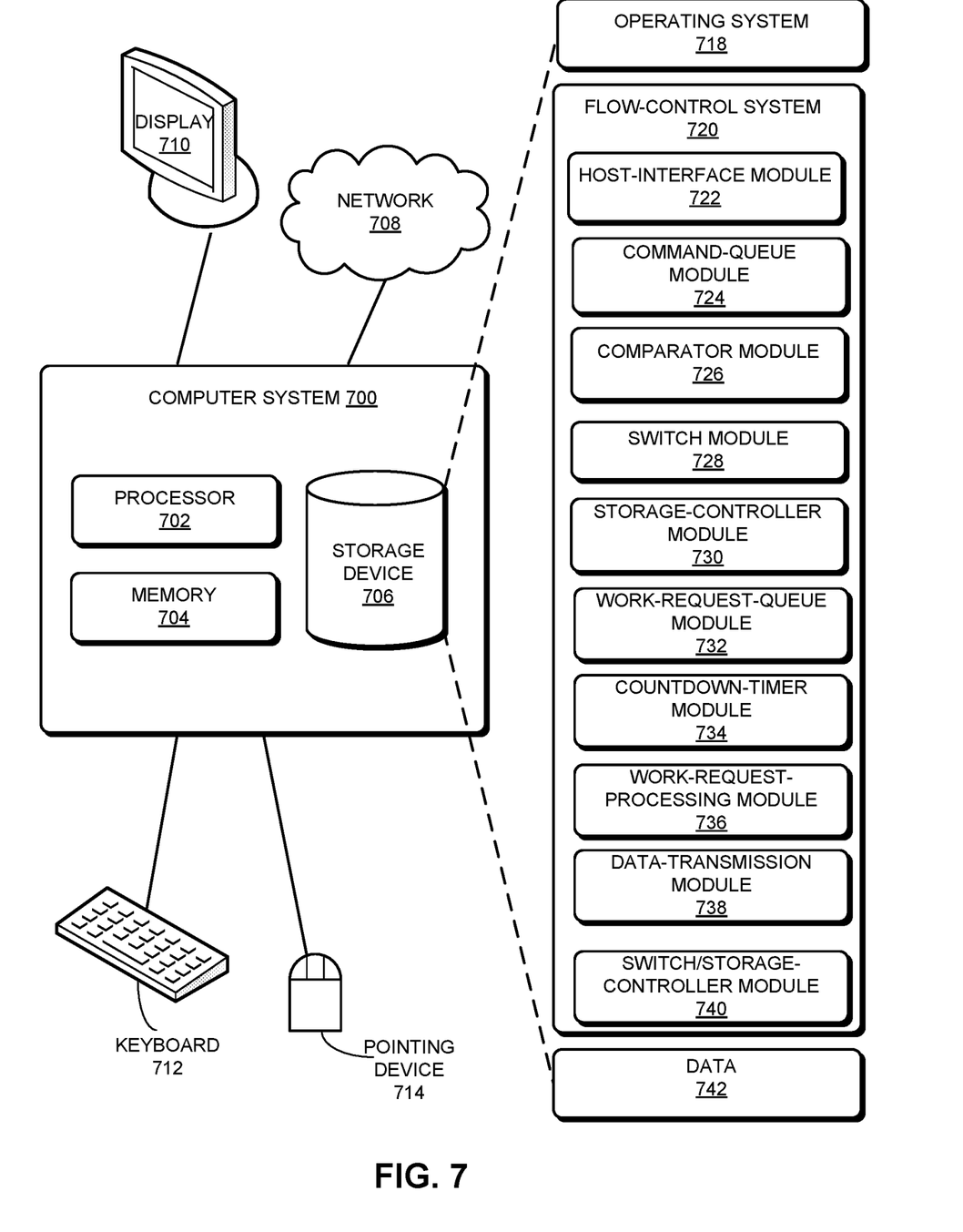
FIG. 7 illustrates an exemplary computer system that facilitates the flow control in a network, according to one embodiment.

FIG. 7 illustrates an exemplary computer system that facilitates the flow control in a network, according to one embodiment. Computer system 700 includes a processor 702, a memory 704, and a storage device 706. Computer system 700 can be coupled to a display device 710, a keyboard 712, and a pointing device 714, and can also be coupled via one or more network interfaces to network 708. Storage device 706 can store an operating system 718, a flow-control system 720, and data 742.

Flow-control system 720 can include instructions, which when executed by computer system 700 can cause computer system 700 to perform methods and/or processes described in this disclosure. Flow-control system 720 can include instructions for interfacing with hosts (host-interface module 722), instructions for maintaining a number of command queues (command-queue module 724), instructions for maintaining a number of comparators (comparator module 726), instructions for performing traffic-switching functions (switch module 728), instructions for controlling operations of a storage module (storage-controller module 730), instructions for maintaining a number of work-request queues (work-request-queue module 732), instructions for maintaining a number of countdown timers (countdown-timer module 734), instructions for processing work requests (work-request-processing module 736), instructions for transmitting data to hosts (data-transmission module 738), and instructions for interfacing and controlling operations of a switch and a storage controller (switch/storage-controller module 740).

In general, the disclosed system provides an end-to-end flow-control mechanism in a system comprising networked devices having mismatched link rates. More specifically, two end devices coupled to a switched fabric via links of different rates can negotiate a rate during an initial communication-establishment process. When one end device is transmitting a frame to the other end device, the controller of the transmitting end device can set a countdown timer, with the initial value of the countdown timer set as the time needed for transmitting the frame using the negotiated rate. The transmission of the frame and the countdown timer can start simultaneously. The transmitting end device is configured to delay the transmission of a subsequent frame until the countdown timer has expired. This can prevent the transmitting end device from transmitting data at a rate that is faster than the negotiated rate. In addition to regulating the frame transmission rate, the disclosed embodiments also implement a mechanism to delay the delivery of a data-access command from one end device to the other end device to prevent the requesting end device from exhausting the memory resources of the responding end device. More specifically, when the requesting end device sends a data-requesting command to the responding end device via the switched fabric, the switched fabric temporarily holds the data-requesting command in a queue allocated for the requesting end device. Before the head of the queue is removed and forwarded to the responding end device, the switched fabric can determine if the amount of data pending for transmission from the responding device to the requesting device exceeds a predetermined threshold. The threshold value can be the maximum memory space on the responding end device that can be allocated to buffer the data to be transmitted to the requesting end device. The head of the queue can be forwarded to the responding device only when the amount of pending data is less than the threshold. This can ensure that the full bandwidth of the responding end device can be used by different requesting end devices, without one requesting end device exhausting the memory resources to block other end devices from accessing data on the responding end device. This novel flow-control mechanism can increase the use of the link rate of the networked devices while preventing frame loss and providing fairness among multiple end devices accessing data on a single end device.

In the various examples shown in FIGS. 1-7, the end devices can be NVMe-oF enabled and can include hosts and storage devices. In practice, other networking protocols can also be implemented and the switched fabric can include any type of switch capable of traffic switching. Moreover, the end devices can include other types of terminal devices capable of communicating with each other by exchanging requests and responses.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method, comprising:
   receiving, by a switch coupling a plurality of hosts to a storage device, commands from the hosts to access the storage device;
   queuing, at the switch, the commands from different hosts of the plurality of hosts in different host-specific command queues;
   determining a total amount of data pending transmission to a respective host of the different hosts from the storage device based on entries in a corresponding host-specific work-request queue maintained by a controller of the storage device, wherein the corresponding host-specific work-request queue corresponds to the respective host, wherein a respective entry of the entries in the corresponding host-specific work-request queue indicates a length of a to-be-transmitted data frame, wherein the total amount of the data pending transmission is determined based on the length indicated by each of the entries;
   in response to determining that the total amount of the data pending transmission is below a predetermined threshold, removing a command from a host-specific command queue corresponding to the respective host;
   forwarding the removed command to the controller of the storage device;
   creating, by the controller, one or more additional entries in the corresponding host-specific work-request queue, the one or more additional entries associated with the removed command forwarded to the controller; and
   in response to determining that the total amount of the data pending transmission exceeds the predetermined threshold, stopping, at the switch, the command from the host-specific command queue from being forwarded to the controller.

2. The method of claim 1, wherein a total number of host-specific command queues corresponds to a total number of the plurality of hosts coupled to the switch.

3. The method of claim 1, wherein the predetermined threshold is determined based on a size of memory space allocated to the respective host by the storage device.

4. The method of claim 1, comprising:
   dividing a command received from the respective host into multiple smaller commands; and
   placing the multiple smaller commands into the host-specific command queue corresponding to the respective host.

5. The method of claim 1, wherein the respective entry in the corresponding host-specific work-request queue indicates a location of the to-be-transmitted data frame.

6. The method of claim 1, comprising:
   negotiating a link rate between the respective host and the storage device, wherein the respective host is coupled to the switch via a first communication link, wherein the storage device is coupled to the switch via a second communication link, and wherein the first and second communication links have different link rates; and
   setting a starting value of a countdown timer based on the determined link rate and the length of the to-be-transmitted data frame.

7. The method of claim 6, wherein the respective host and the storage device communicate with each other using a non-volatile memory express over fabric (NVMe-oF) technique, and wherein negotiating the link rate between the respective host and the storage device comprises exchanging information associated with the different link rates while performing an NVMe-oF connection establishment.

8. The method of claim 6, wherein negotiating the link rate comprises:
   determining, by a controller unit coupled to the switch, a link rate of the first communication link;
   determining, by the controller unit, a link rate of the second communication link; and
   determining the link rate between the respective host and the storage device based on the determined link rates of the first and second communication links.

9. The method of claim 6, wherein the starting value of the countdown timer equals a duration needed for transmitting the to-be-transmitted data frame using the negotiated link rate.

10. The method of claim 6, comprising:
    running the countdown timer while transmitting the to-be-transmitted data frame to the respective host; and
    waiting for the countdown timer to expire before transmitting a subsequent data frame corresponding to a next entry in the corresponding host specific work-request queue.

11. A computer system, comprising:
    a processor; and
    a memory storing instructions that when executed by the processor cause the processor to perform a method, the method comprising:
      receiving, by a switch coupling a plurality of hosts to a storage device, commands from the hosts to access the storage device;
      queuing, at the switch, the commands from different hosts of the plurality of hosts in different host-specific command queues;
      determining a total amount of data pending transmission to a respective host of the different hosts from the storage device based on entries in a corresponding host-specific work-request queue maintained by a controller of the storage device, wherein the corresponding host-specific work-request queue corresponds to the respective host, wherein a respective entry of the entries in the corresponding host-specific work-request queue indicates a length of a to-be-transmitted data frame, wherein the total amount of the data pending transmission is determined based on the length indicated by each of the entries;

in response to determining that the total amount of the data pending transmission is below a predetermined threshold, removing a command from a host-specific command queue corresponding to the respective host;

forwarding the removed command to the controller of the storage device;

creating, by the controller, one or more additional entries in the corresponding host-specific work-request queue, the one or more additional entries associated with the removed command forwarded to the controller; and in response to determining that the total amount of the data pending transmission exceeds the predetermined threshold, stopping, at the switch, the command from the host-specific command queue from being forwarded to the controller.

12. The computer system of claim 11, wherein a total number of host-specific command queues corresponds to a total number of the plurality of hosts coupled to the switch.

13. The computer system of claim 11, wherein the predetermined threshold is determined based on a size of memory space allocated to the respective host by the storage device.

14. The computer system of claim 11, wherein the method further comprises:

dividing a command received from the respective host into multiple smaller commands; and placing the multiple smaller commands into the host-specific command queue corresponding to the respective host.

15. The computer system of claim 11, wherein the respective entry in the corresponding host-specific work-request queue indicates a location of the to-be-transmitted data frame.

16. The computer system of claim 11, wherein the method further comprises:

negotiating a link rate between the storage device and the respective host, wherein the respective host is coupled to the switch via a first communication link, wherein the storage device is coupled to the switch via a second communication link, and wherein the first and second communication links have different link rates; and setting a starting value of a countdown timer based on the determined link rate and the length of the to-be-transmitted data frame.

17. The computer system of claim 16, wherein the respective host and the storage device communicate with each other using a non-volatile memory express over fabric (NVMe-oF) technique, and wherein negotiating the link rate between the respective host and the storage device comprises exchanging information associated with the different link rates while performing an NVMe-oF connection establishment.

18. The computer system of claim 16, wherein the method further comprises:

determining, by a controller unit coupled to the switch, a link rate of the first communication link;

determining, by the controller unit, a link rate of the second communication link; and determining the link rate between the storage device and the respective host based on the determined first and second communication link rates.

19. The computer system of claim 16, wherein the starting value of the countdown timer equals a duration needed for transmitting the to-be-transmitted data frame using the negotiated link rate.

20. The computer system of claim 16, wherein the method further comprises:

running the countdown timer while transmitting the to-be-transmitted data frame to the respective host; and waiting for the countdown timer to expire before transmitting a subsequent data frame corresponding to a next entry in the corresponding host-specific work-request queue.

* * * * *